United States Patent Office 3,516,995
Patented June 23, 1970

3,516,995
BENZALHYDRAZONES
William J. Houlihan and Robert E. Manning, Mountain Lakes, N.J., assignors to Sandoz-Wander, Inc., a corporation of Delaware
No Drawing. Continuation-in-part of application Ser. No. 743,985, July 11, 1968, which is a continuation-in-part of application Ser. No. 682,490, Nov. 13, 1967, which in turn is a continuation-in-part of application Ser. No. 666,956, Sept. 11, 1967. This application Feb. 27, 1969, Ser. No. 803,061
Int. Cl. C07d 49/34
U.S. Cl. 260—240
6 Claims

ABSTRACT OF THE DISCLOSURE

Novel benzalhydrazones, e.g., 2,6-dichlorobenzaldehyde-2-imidazolin-2-yl-hydrazone, useful as hypotensives.

---

This application is a continuation-in-part of application Ser. No. 743,985, filed July 11, 1968, which in turn is a continuation-in-part of application Ser. No. 682,490, filed Nov. 13, 1967 which in turn is a continuation-in-part of application Ser. No. 666,956, filed Sept. 11, 1967, now all abandoned.

This invention relates to novel heterocyclic compounds. More particularly, it is concerned with new benzalhydrazones and a process for their production.

The present invention provides benzalhydrazones of the formula

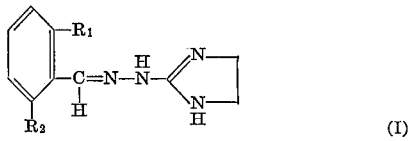

(I)

and pharmaceutically acceptable salts thereof with inorganic and organic acids, where each of $R_1$ and $R_2$, independently, signifies chlorine, fluorine, methyl or methoxy.

The present invention further provides a process for the production of the compounds of Formula I and their acid addition salts, which comprises reacting an aldehyde of the general formula

(II)

where $R_1$ and $R_2$ have the above significance, with 2-hydrazino-2-imidazoline of the formula

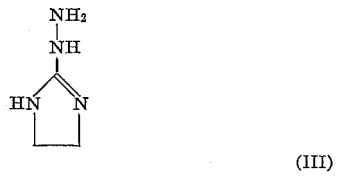

(III)

and, when an acid addition salt is required, salifying.

The reaction of the invention is preferably effected in a solvent, the preferred solvents being alcohols such as methanol, ethanol or isopropanol, though other inert solvents such as, for example, benzene, toluene, tetrahydrofuran and pentane may also be utilized. The preferred temperature range for the reaction is between 25° C. and reflux temperature of the solvent used. While the reaction time will depend upon the reaction conditions utilized, a suitable reaction time has been found to be between 2 and 24 hours. Neither the solvent nor the temperature of reaction is critical in obtaining the compounds (I).

In a preferred embodiment of the invention, the compound (III) is used in the form of its acid addition salt, e.g., the hydroiodide. It is to be understood that when the acid addition salt of the compound (III) is utilized and compound (I) is required in the form of the free base, a basic agent, such as potassium hydroxide, should be employed.

Compound (III) is known and compounds (II) are either known or may be produced in a manner known per se. The term "in a manner known per se" used herein designates methods in use or described in the literature.

The hydrazones of Formula I are generally solids at room temperature; with inorganic and organic acids they form stable salts which are crystalline at room temperature. Examples of acids for acid addition salt formation with compounds (I) are: hydrochloric, hydrobromic, methanesulphonic, oxalic, tartaric, malic, maleic, fumaric, citric and benzoic acid.

The compounds of Formula I and their acid addition salts are useful because they possess pharmacological activity in animals. In particular, the compounds are useful as hypotensives, as indicated by their activity in anesthetized dog given 10 mg./kg. i.v. of active compound and tested by blood pressure measurement using a mercury manometer or transducer via a catheter inserted in the carotid or femoral artery.

For the above-mentioned use, the dosage will vary depending upon the particular compound employed and the mode of administration. In general, satisfactory results are obtained when the active compounds are administered at a daily dosage of from about 0.01 milligram to about 50 milligrams per kilogram of animal body weight. The compounds are preferably given in divided doses, 2 to 4 times a day, or in sustained release form. For most larger mammals (e.g., primates) the total daily dosage is from about 0.3 milligram to about 10 milligrams. Dosage forms suitable for use internally comprise from about 0.075 to about 5 milligrams of the compound in admixture with a solid or liquid pharmaceutical carrier or diluent.

The compounds of the invention may be used as pharmaceuticals on their own or in the form of appropriate medicinal preparations for administration, e.g., enterally or parenterally. In order to produce suitable medicinal preparations the compounds are worked up with inorganic or organic adjuvants which are inert and physiologically acceptable. Examples of such adjuvants are:

For tablets and dragees—lactose, starch, talc and stearic acid;
For injectable solutions—water, alcohols, glycerin and vegetable oils;
For suppositories—natural or hardened oils and waxes.

The preparation may furthermore contain suitable preserving, stabilizing and wetting agents, solubilizers, sweetening and coloring substances and flavorings.

A representative formulation suitable for oral administration is a tablet prepared by standard tabletting techniques which contain the following:

| Ingredient: | Parts by weight |
|---|---|
| N-(2-chloro-6-fluorobenzaldehyde)-2-imidazoline-2-yl hydrazone hydrogen iodide | 10 |
| Tragacanth | 2 |
| Lactose | 79.5 |
| Corn starch | 5 |
| Talcum | 3 |
| Magnesium stearate | 0.5 |

EXAMPLE 1

2,6-dichlorobenzaldehyde-2-imidazolin-2-yl-hydrazone

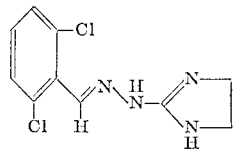

To a flask equipped with a magnetic stirring bar is added 22.8 g. (0.10 mole) 2-hydrazinoimidazoline hydroiodide, 50 ml. 2 N potassium hydroxide, 150 ml. ethanol and 19.3 g. (0.11 mole) 2,6-dichlorobenzaldehyde. The reaction mixture is stirred and refluxed for 12 hours, and the solvent is removed in vacuo on a rotary evaporator. The residue is extracted with 250 ml. of hot toluene, and the insoluble salts are filtered off. The toluene filtrate is cooled and concentrated whereupon 2,6-dichlorobenzaldehyde-2-imidazolin-2-yl-hydrazone, M.P. 177–178° C. results.

EXAMPLE 2

N-(2-chloro-6-fluorobenzaldehyde)-2-imidazolin-2-yl hydrazone hydrogen iodide

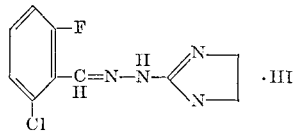

A mixture of 3.2 g. (0.02 mole) of 2-chloro-6-fluorobenzaldehyde, 5.7 g. (0.025 mole) 2-hydrazino-2-imidazoline hydrogen iodide and 50 ml. of ethanol is stirred at room temperature for 18 hours. The resultant solid is filtered off and crystallized from isopropanol to give 3.3 g. of N-(2-chloro-6-fluorobenzaldehyde-2-imidazolin-2-yl hydrazone hydrogen iodide; M.P. 250–252° C.

EXAMPLE 3

2,6-dimethoxybenzaldehyde-2-imidazolin-2-yl hydrazone hydrogen iodide

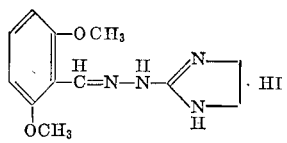

A mixture of 4.2 g. (0.025 mole) 2,6-dimethoxybenzaldehyde, 6.85 g. (0.03 mole) 2-hydrazinoimidazoline hydrogen iodide, and 75 ml. of ethanol is stirred at room temperature for 18 hours. The resultant solid is filtered off and crystallized from isopropanol to give 2,6-dimethoxybenzaldehyde-2-imidazolin-2-yl hydrazone hydrogen iodide; M.P. 217–219° C.

EXAMPLE 4

2,6-dimethylbenzaldehyde-2-imidazolin-2-yl hydrazone hydrochloride

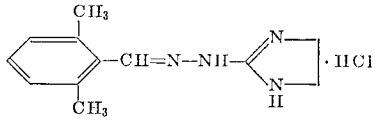

A mixture of 2,6-dimethylbenzaldehyde (5.4 g.) and 2-hydrazino-2-imidazoline hydroiodide (6.8 g.) in ethanol (150 ml.) is stirred at room temperature for 58 hours. The resultant crystals are collected by filtration and then washed with ethanol to give 7.1 g. of 2,6-dimethylbenzaldehyde-2-imidazolin-2-yl hydrazone hydroiodide, M.P. 250–252° C. dec. g. of this hydroiodide is converted to the free base with methanol-water-sodium carbonate solution. The free base is then converted to the hydrochloride salt in methanol-ether using hydrogen chloride gas. The resultant solid is crystallized from methanol-ether to give 3.0 g. of 2,6-dimethylbenzaldehyde-2-imidazolin-2-yl hydrazone hydrochloride, M.P. 167–169° C.

What is claimed is:

1. A compound of the formula

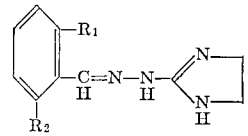

or a pharmaceutically acceptable acid addition salt thereof, wherein $R_1$ represents chlorine, fluorine, methyl or methoxy, and $R_2$ represents chlorine, fluorine, methyl or methoxy.

2. A compound of the formula

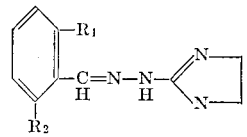

of a pharmaceutically acceptable acid addition salt thereof, wherein $R_1$ represents chlorine or fluorine, and $R_2$ represents chlorine or fluorine.

3. The compound of claim 1 which is 2,6-dichlorobenzaldehyde-2-imidazolin-2-yl hydrazone.

4. The compound of claim 1 which is N-(2-chloro-6-fluorobenzaldehyde)-2-imidazolin-2-yl hydrazone.

5. The compound of claim 1 which is 2,6-dimethoxybenzaldehyde-2-imidazolin-2-yl hydrazone.

6. The compound of claim 1 which is 2,6-dimethylbenzaldehyde-2-imidazolin-2-yl hydrazone.

References Cited

UNITED STATES PATENTS 3,213,138   10/1965   Biel _____ 260—240 XR

OTHER REFERENCES

Finnegan et al., J. Org. Chem. vol. 18, page 790 (1953).
Finnegan et al., J. Org. Chem. vol 30, pages 567 to 574 (Feb. 1965).

JOHN D. RANDOLPH, Primary Examiner

U.S. Cl. X.R.

424—273.